(12) United States Patent
Anspaugh et al.

(10) Patent No.: US 11,866,093 B2
(45) Date of Patent: Jan. 9, 2024

(54) ENERGY ABSORPTION STRAP ASSEMBLY WITH CUSTOMIZABLE CONTROL BRACKET

(71) Applicant: Steering Solutions IP Holding Corporation, Saginaw, MI (US)

(72) Inventors: Michael P. Anspaugh, Bay City, MI (US); Randy W. Jones, North Branch, MI (US); Chet A. Hickmott, Bay City, MI (US); Shenbing Wen, Jiangsu (CN)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 18/075,712

(22) Filed: Dec. 6, 2022

(65) Prior Publication Data

US 2023/0211822 A1 Jul. 6, 2023

Related U.S. Application Data

(60) Provisional application No. 63/295,283, filed on Dec. 30, 2021.

(51) Int. Cl.
*B62D 1/185* (2006.01)
*B62D 1/19* (2006.01)

(52) U.S. Cl.
CPC ............. *B62D 1/192* (2013.01); *B62D 1/185* (2013.01)

(58) Field of Classification Search
CPC .................................................... B62D 1/192
See application file for complete search history.

(56) References Cited

U.S. PATENT DOCUMENTS

| | | | | |
|---|---|---|---|---|
| 9,834,246 B1* | 12/2017 | Woycik | .................. | B62D 1/195 |
| 9,969,345 B2* | 5/2018 | Dubay | .................... | F16F 7/128 |
| 2005/0194777 A1* | 9/2005 | Manwaring | ............ | B62D 1/195 |
| | | | | 280/777 |
| 2015/0375771 A1* | 12/2015 | Tinnin | .................... | B62D 1/185 |
| | | | | 74/529 |
| 2016/0244015 A1* | 8/2016 | Dubay | .................... | B60R 21/02 |
| 2016/0368524 A1* | 12/2016 | Tinnin | .................... | B62D 1/192 |
| 2019/0185046 A1* | 6/2019 | Reno | ...................... | B62D 1/195 |
| 2020/0406952 A1* | 12/2020 | Gosztyla | ................ | B62D 1/192 |
| 2021/0316779 A1* | 10/2021 | Dubay | .................... | B62D 1/184 |

(Continued)

FOREIGN PATENT DOCUMENTS

| | | | | |
|---|---|---|---|---|
| CN | 109789890 A | * | 5/2019 | ............. B62D 1/184 |
| CN | 112141203 A | * | 12/2020 | ............... B62D 1/16 |
| DE | 102016117277 A1 | * | 3/2018 | |

(Continued)

*Primary Examiner* — Nicole T Verley
(74) *Attorney, Agent, or Firm* — Dickinson Wright PLLC

(57) ABSTRACT

A steering column assembly includes a lower jacket. The steering column assembly also includes an upper jacket in telescoping engagement with the lower jacket. The steering column assembly further includes an energy absorbing strap assembly operatively coupled to the upper jacket. The energy absorbing strap assembly includes an energy absorbing strap having a first leg portion, a second leg portion and a curved portion connecting the first leg portion and the second leg portion, the first leg portion coupled to the upper jacket. The energy absorbing strap also includes a control bracket defining a slot sized to receive the curved portion of the energy absorbing strap.

13 Claims, 5 Drawing Sheets

(56) References Cited

U.S. PATENT DOCUMENTS

2022/0126907 A1\*    4/2022  Dubay ................... F16F 7/126
2022/0135114 A1\*    5/2022  Vermeersch ........... B62D 1/192
                                                          74/493

FOREIGN PATENT DOCUMENTS

| DE | 102019219112 A1 | \* | 6/2020 | ............ B62D 1/184 |
|----|----|----|----|----|
| KR | 20200044375 A | \* | 10/2018 | |
| KR | 102282125 B1 | \* | 4/2020 | |
| KR | 20210125208 A | \* | 4/2020 | |
| WO | WO-2004098951 A2 | \* | 11/2004 | ............ B62D 1/195 |
| WO | WO-2018025160 A1 | \* | 2/2018 | ............ B62D 1/184 |
| WO | WO-2018160788 A1 | \* | 9/2018 | |

\* cited by examiner

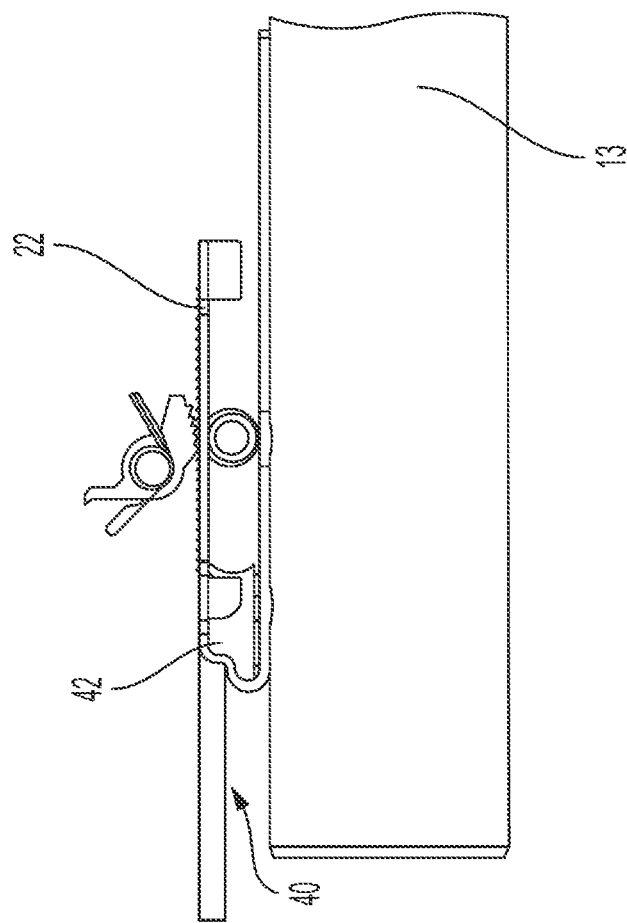
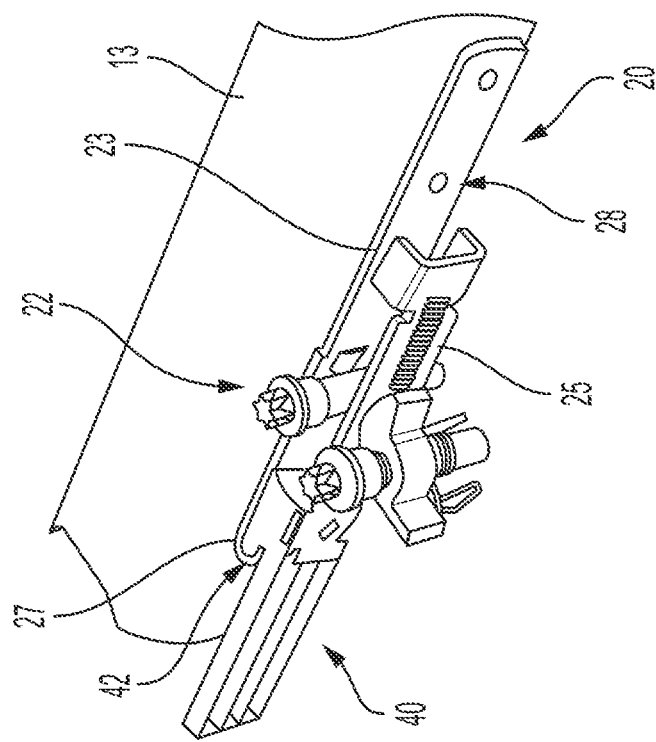
FIG. 3
FIG. 4

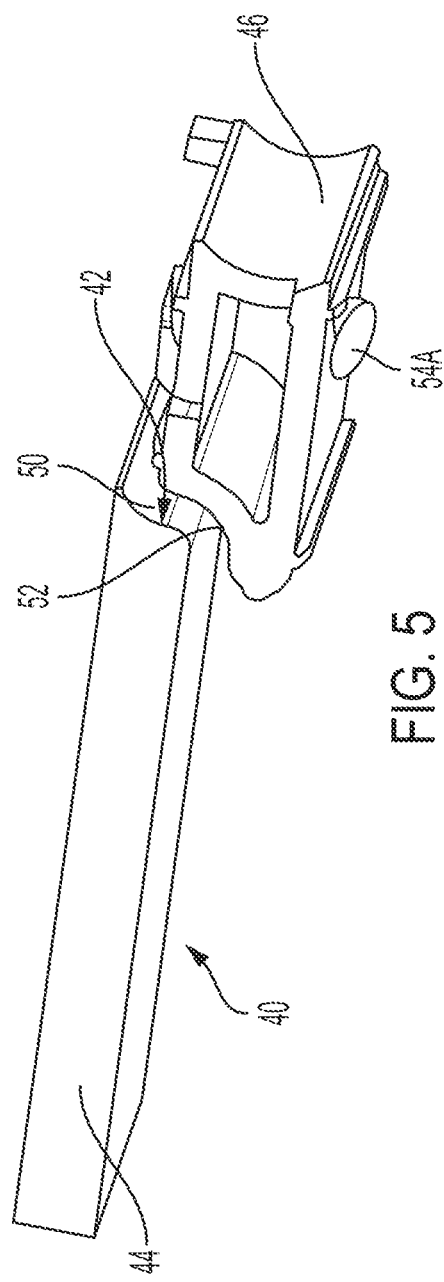
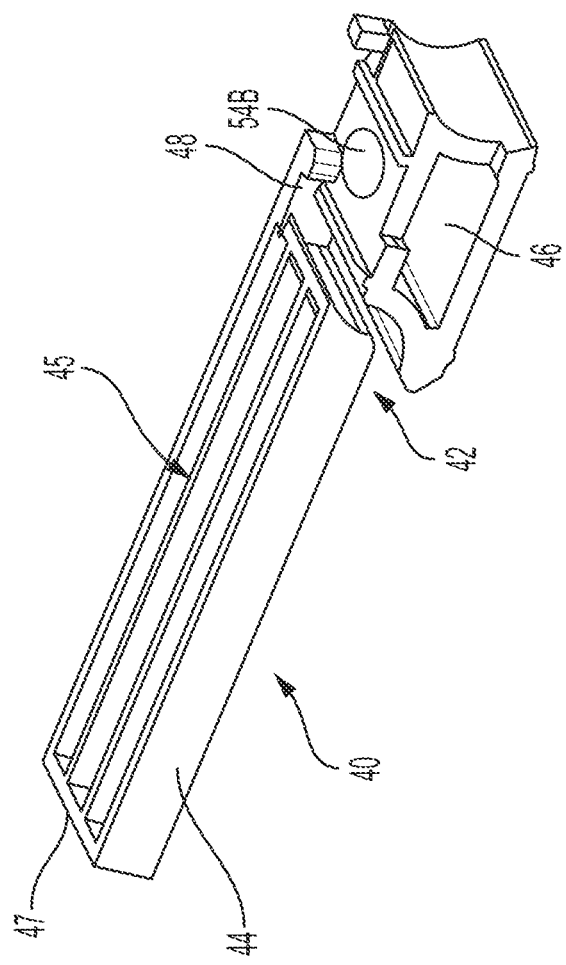
FIG. 5
FIG. 6

… (1) …

ENERGY ABSORPTION STRAP ASSEMBLY WITH CUSTOMIZABLE CONTROL BRACKET

CROSS-REFERENCE TO RELATED APPLICATION

This application claims the benefits of priority to U.S. Provisional Patent Application Ser. No. 63/295,283, filed Dec. 30, 2021, the disclosure of which is incorporated by reference herein in its entirety.

FIELD OF THE INVENTION

The embodiments described herein relate to vehicle steering systems and, more particularly, to an energy absorption strap assembly with a customizable control bracket.

BACKGROUND

A steering column assembly of a vehicle may include one or more energy absorption features. For example, an energy absorption strap (EA strap) assembly may be operatively coupled to an upper jacket and configured to unroll once a specified collapse load is exceeded. On adjustable steering columns, energy absorbing straps are utilized to absorb an occupant's mass during a collapse event of the steering column.

Vehicle OEMs typically request the ability to tune one or more characteristics, such as the crash stroke EA load, initial breakaway, and/or profile duration, for example. OEMs commonly estimate ranges of such characteristics to start a project, then refine their requests throughout project implementation. A design that is flexible to meet a wide range of load levels and profiles, along with short lead times and reasonable cost to adjust, would be well received in the automotive industry.

SUMMARY

According to one aspect of the disclosure, a steering column assembly includes a lower jacket. The steering column assembly also includes an upper jacket in telescoping engagement with the lower jacket. The steering column assembly further includes an energy absorbing strap assembly operatively coupled to the upper jacket. The energy absorbing strap assembly includes an energy absorbing strap having a first leg portion, a second leg portion and a curved portion connecting the first leg portion and the second leg portion, the first leg portion coupled to the upper jacket. The energy absorbing strap also includes a control bracket defining a slot sized to receive the curved portion of the energy absorbing strap.

According to another aspect of the disclosure, a steering column assembly includes a lower jacket. The steering column assembly also includes an upper jacket in telescoping engagement with the lower jacket. The steering column assembly further includes an energy absorbing strap assembly. The energy absorbing strap assembly includes a first leg portion operatively coupled to the upper jacket. The energy absorbing strap assembly also includes a second leg portion which is a separate component than the first leg portion and operatively coupled thereto. The energy absorbing strap assembly further includes a control bracket fixed to the second leg portion.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 3 is a perspective view of the energy absorption strap assembly of FIG. 2;

FIG. 4 is a cross-sectional view of the energy absorption strap assembly of FIGS. 2 and 3;

FIG. 5 is a first perspective view of a control bracket of the energy absorption strap assembly of FIGS. 2-4;

FIG. 6 is a second perspective view of the control bracket of FIG. 5; and

DETAILED DESCRIPTION

The following discussion is directed to various embodiments of the disclosure. Although one or more of these embodiments may be described in more detail than others, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable vehicles, include various steering system schemes, for example, steer-by-wire and driver interface steering. These steering system schemes typically include a steering column assembly for translating steering input to an output that interacts with a steering linkage to ultimately cause the vehicle wheels to turn. Steering columns include various safety features, such as airbags to lessen impact forces. In addition, many steering column assemblies are collapsible and include one or more energy absorption features, such as energy absorbing straps, that allow a certain amount of compression.

The embodiments disclosed herein may benefit any suitable vehicle, such as a car, a truck, a sport utility vehicle, a mini-van, a crossover, any other passenger vehicle, any suitable commercial vehicle, or any other suitable vehicle. While the vehicle may be a passenger vehicle having wheels and for use on roads, the principles of the present disclosure may apply to other vehicles, such as planes, tractors, boats, or other suitable vehicles. The vehicle may include a propulsion system, such as an ignition system, an electric system, or combinations thereof.

Figure 1:
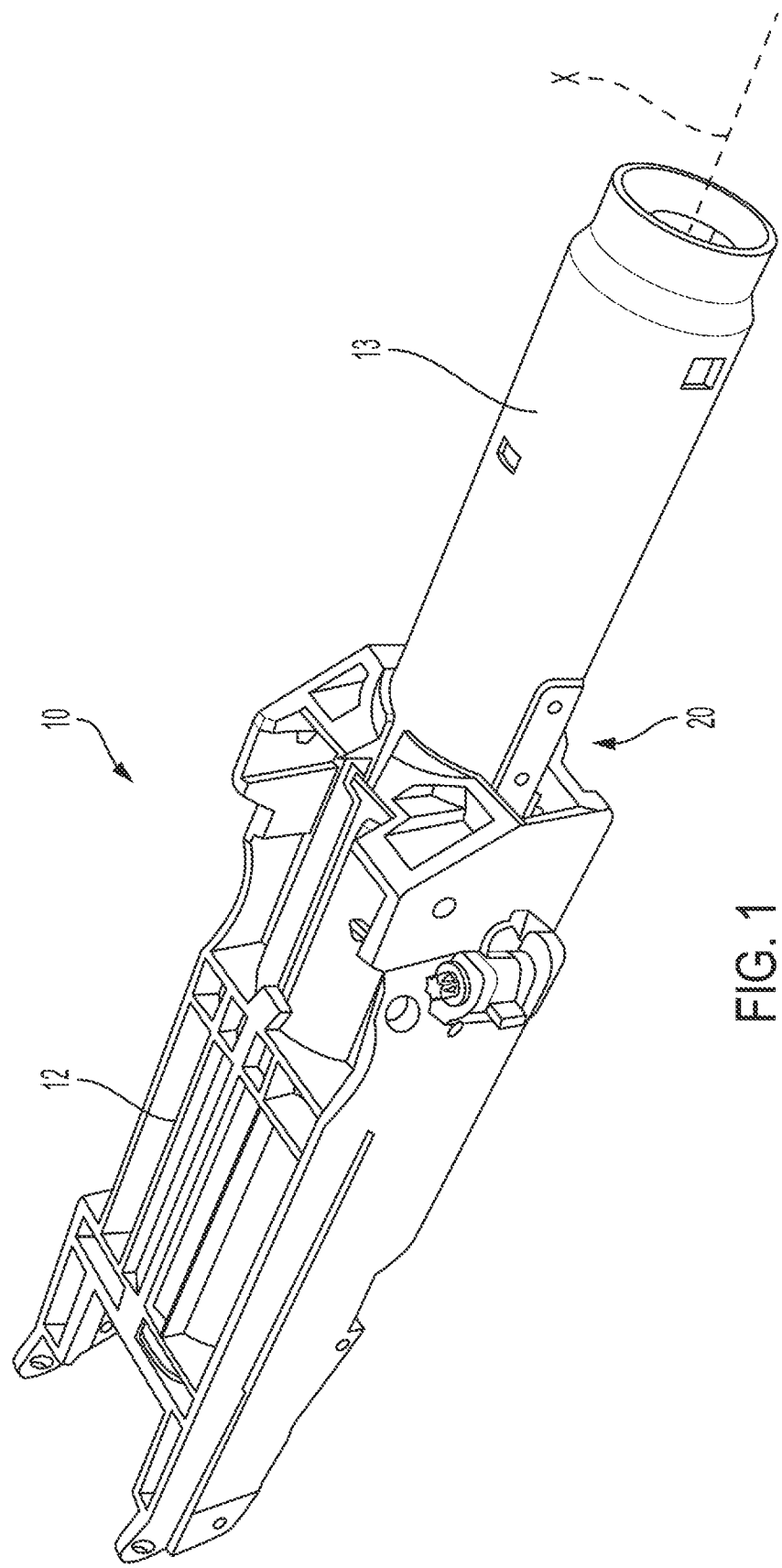
FIG. 1 is a perspective view of a portion of a steering column assembly.

Referring now to FIG. 1, the vehicle includes a steering column assembly 10. The steering column assembly 10 may be configured as a driver interface steering system, an autonomous driving system, or a system that allows for both driver interface and autonomous steering. The steering column assembly 10 may include an input device (not shown), such as a steering wheel, which allows a driver to mechanically provide a manual steering input by turning the steering wheel.

The steering column assembly 10 extends about a longitudinal axis X. The steering column assembly 10 may be adjustable in a telescopic direction substantially parallel with the longitudinal axis X (i.e., adjustable along the longitudinal axis X), and may be adjustable in a rake direction in some embodiments. The steering column assembly 10 includes a lower jacket 12 and an upper jacket 13 extending along the longitudinal axis X. The upper jacket 13 has a portion extending into the lower jacket 12 and is translatable therein. A steering shaft (not shown) is rotatably disposed within the upper jacket 13 and the lower jacket 12. The steering shaft may be one of a plurality of operatively coupled steering shafts in some embodiments.

The upper jacket 13 is movable, relative to the lower jacket 12, during a normal operating condition of the vehicle to telescopically adjust a position of the steering wheel along the longitudinal axis "X." The normal operating condition (also referred to herein as a first condition of the steering column) is defined as a normal driving condition that allows adjustment of the upper jacket 13 over a predefined range of telescoping movement that is suitable for driving.

The steering column 10 is also operable in a second operating condition defined as a collapse of the upper jacket 13 during an energy absorbing event. In this condition, energy-absorbing movement (i.e., energy absorbing collapsibility) of the upper jacket 13 along the longitudinal axis "X" within the lower jacket 12 is provided. To assist with the energy absorbing process during a collapse event, and to reduce the number of components and assembly complexity, an energy absorbing strap assembly is disclosed herein. The energy absorbing strap assembly is generally referenced with numeral 20.

Figure 2:
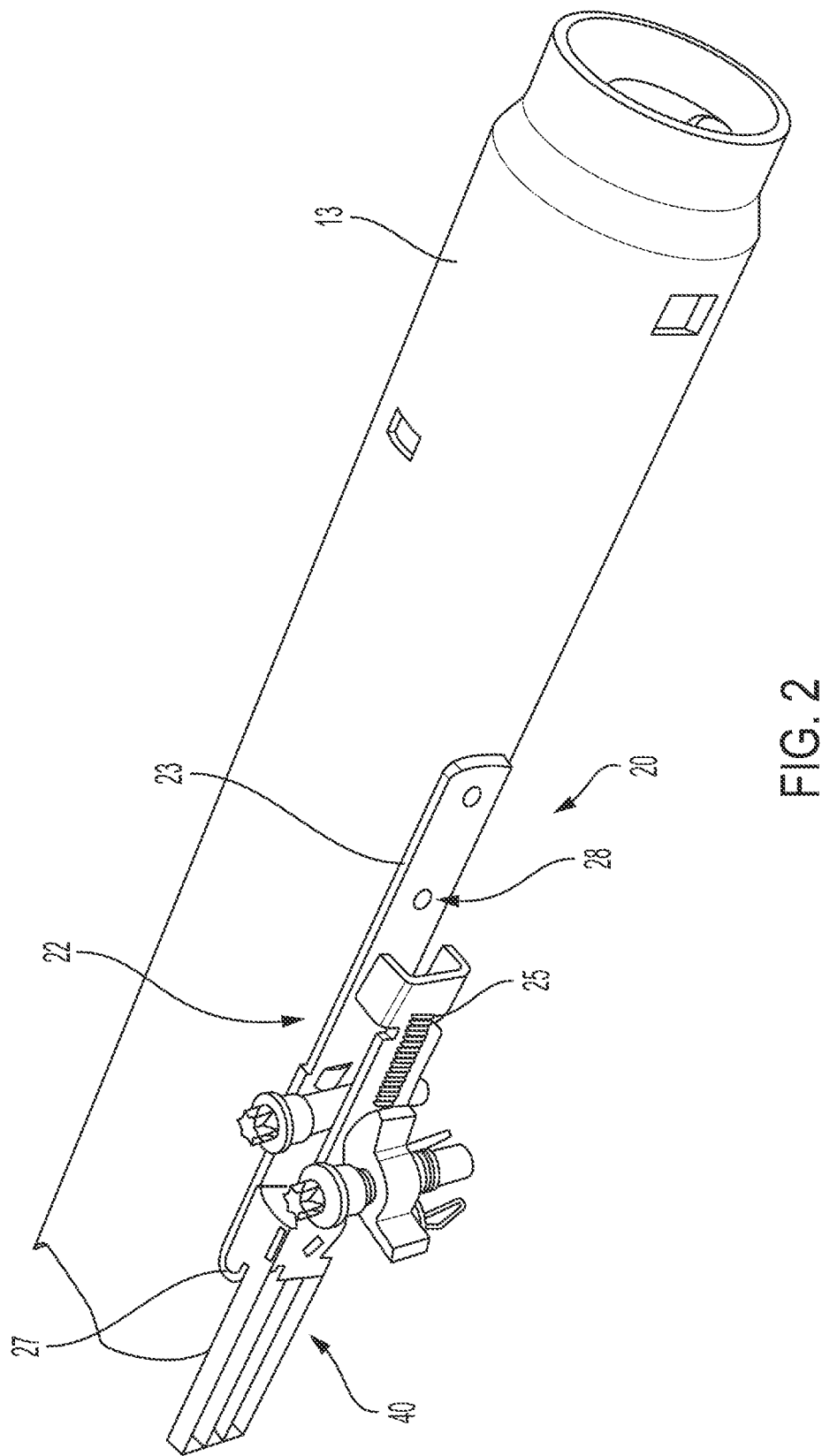
FIG. 2 is a perspective view of an upper jacket of the steering column assembly having an energy absorption strap assembly attached thereto according to one aspect of the disclosure.

Referring now to FIGS. 2-4, the energy absorption strap assembly (EA strap assembly) 20 is illustrated in detail. The EA strap assembly 20 is operatively coupled to the upper jacket 13 to assist with the energy absorbing process during a collapse event. The EA strap assembly 20 includes an energy absorbing strap 22 having a first leg 23 and a second leg 25 which are oriented substantially parallel to each other in a spaced manner. The first leg 23 and the second leg 25 are joined by a curved segment 27 to form a substantially U-shaped energy absorbing strap 22. The first leg 23 extends further from the curved segment 27, relative to the distance that the second leg 25 extends from the curved segment 27 in some embodiments. In such embodiments, the first leg 23 is longer than the second leg 25.

In the illustrated embodiments of FIGS. 2-4, the EA strap assembly 20 includes an EA strap 22 that is a single, integrally formed component.

The first leg 23 defines a pair of apertures 28. The energy absorbing strap 22 is directly coupled to the upper jacket 13 with one or more mechanical fasteners (not shown) that extend through the apertures 28 of the first leg 23. Although illustrated in a specific position, it is to be appreciated that the precise location of the apertures 28 and mechanical fastener(s) may vary depending upon the particular application and on various design factors. The illustrated embodiment shows a pair of apertures 28 that the mechanical fasteners couple with, however more or fewer mechanical fasteners and apertures 28 is within the scope of the disclosure.

The energy absorbing strap 22 includes a stationary portion (which corresponds substantially to the second leg 25) and a moveable portion (which corresponds substantially to the first leg 23) that rolls during an energy absorption event. The stationary portion and the moveable portion are joined by the curved segment 27, as described above.

The curved segment 27 of the energy absorbing strap 22 is positioned within a slot 42 defined by a control bracket 40. As disclosed herein, the control bracket 40 improves the ability to control the energy absorption collapse and breakaway load profiles of the steering column assembly 10. The control bracket 40 also improves the consistency, load level options, and available load profile options. Also, the control bracket 40 simplifies the change of load level and/or load profile for various EA strap assemblies to facilitate customer change requests.

Referring now to FIGS. 5 and 6, the control bracket 40 is shown in greater detail. The control bracket 40 includes a backing portion 44 and a body portion 46. The backing portion 44 and the body portion 46 are integrally formed with each other and connected with a connector segment 48. The backing portion 44 of the control bracket 40 may be formed in different configurations to provide different energy absorption responses, as discussed herein. By way of non-limiting example, the illustrated embodiment shows a backing portion 44 having a plurality of longitudinally extending rails 45 laterally spaced from each other. As shown, the rails 45 may be substantially parallel to each other and have an end rail 47 extending across the distal ends thereof. The connector segment 48 is located at an edge of the control bracket 40, with the remainder of the width of the control bracket 40—extending from the connector segment 48—defining the slot 42 between the backing portion 44 and the body portion 46. In particular, a first wall 50 located proximate an end of the backing portion 44 and a second wall 52 located proximate an end of the body portion 46 define the slot 42.

The connector segment 48 is aligned with the slot 42 at an overlapping location along a longitudinal direction of the control bracket 40 in the illustrated embodiment, such that the connector segment 48 and the slot 42 are adjacent to each other.

The slot 42 is sized to receive the curved segment 27 of the energy absorbing strap 22. The proximity (including contact therewith) and the geometry of the slot 42, as defined by the first wall 50 and the second wall 52, may be customized to influence the breakaway profile shape and duration during an energy absorption event. Enhancing the customizable nature of the control bracket 40 is the backing portion 44, as the geometry and the overall backing stiffness controls the energy absorption load profile by managing an energy absorption strap roll radius.

In some embodiments, the control bracket 40 includes one or more breakaway shear features. For example, as shown in FIG. 5, a first shear feature 54A interacts with the energy absorption strap 22 and provides resistance up to a predetermined load. The breakaway shear feature 54A may be a cylindrical-shaped protrusion (e.g., pin) or any other protrusion extending away from the control bracket 40. In the illustrated embodiment, the breakaway shear feature 54A extends from a first side of the body portion 46 of the control bracket 40 to interact with the energy absorption strap 22 where relative motion occurs between the energy absorption strap 22 and the control bracket 40. The portion of the energy absorption strap 22 that the breakaway shear feature 54A interacts with may be a recess within one of the legs 23 or 25 or may be a through-hole defined by one of the legs 23 or 25. The breakaway shear feature 54A resists up to a predetermined load to enhance the customizability of the control bracket 40. A second breakaway shear feature 54B is provided in some embodiments, as shown in FIG. 6. The second breakaway shear feature 54B extends from a second side of the body portion 46 of the control bracket 40 and stabilizes the control bracket 40 during shearing and the energy absorption event, as well as to assist to secure the components as a sub-assembly.

Figure 7:
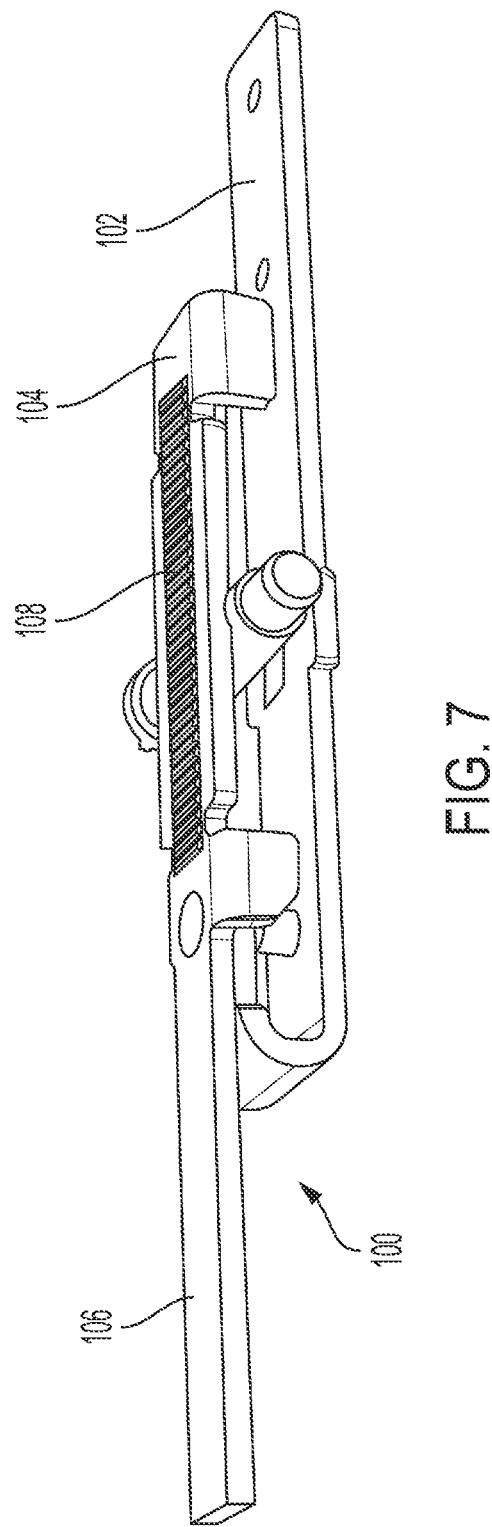
FIG. 7 is a perspective view of the energy absorption strap assembly according to another aspect of the disclosure.

Referring now to FIG. 7, the EA strap assembly is shown according to another embodiment of the disclosure and is referenced generally with numeral 100. The EA strap assembly 100 includes a two-piece energy absorbing strap having a first leg 102 and a component secured thereto which comprises a second leg 104 and a control bracket 106. The first leg 102 and the second leg 104 are separate components (i.e., not integrally formed) which allows the legs 102, 104 to be formed of different materials.

The first leg 102 is coupleable to the upper jacket 13. The first leg 102 allows increased options for using higher yield steel material, as no tooth formation thereon is necessary. The second leg 104 has a toothed region 108 that allows for load profile control, as it facilitates the use of easy to form low yield material of consistent thickness. The control bracket 106 is an end section for roll radius load control. The options include adding a plastic material to the top and/or bottom surface; shape stamping surface and/or truncating the extension length; and folding the end or tabs along the side.

While the invention has been described in detail in connection with only a limited number of embodiments, it is to be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly comprising:
a lower jacket,
an upper jacket in telescoping engagement with the lower jacket, and
an energy absorbing strap assembly operatively coupled to the upper jacket, the energy absorbing strap assembly comprising:
an energy absorbing strap having a first leg portion, a second leg portion and a curved portion connecting the first leg portion and the second leg portion, the first leg portion coupled to the upper jacket, and
a control bracket defining a slot sized to receive the curved portion of the energy absorbing strap, wherein the control bracket comprises a backing portion and a body portion connected to each other with a connector segment, wherein the connector segment comprises a wall at a lateral edge of the control bracket.

2. The steering column assembly of claim 1, wherein the energy absorbing strap is a single integrally formed component.

3. The steering column assembly of claim 1, wherein the energy absorbing strap is a single integrally formed component.

4. The steering column assembly of claim 1, wherein the connector segment is adjacent to the slot defined by the control bracket.

5. The steering column assembly of claim 1, wherein the connector segment is aligned with the slot defined by the control bracket at an overlapping location along a longitudinal direction of the control bracket.

6. A steering column assembly comprising:
a lower jacket,
an upper jacket in telescoping engagement with the lower jacket, and
an energy absorbing strap assembly operatively coupled to the upper jacket, the energy absorbing strap assembly comprising:
an energy absorbing strap having a first leg portion, a second leg portion and a curved portion connecting the first leg portion and the second leg portion, the first leg portion coupled to the upper jacket, and
a control bracket defining a slot sized to receive the curved portion of the energy absorbing strap, wherein the control bracket comprises a backing portion and a body portion connected to each other with a connector segment, wherein the control bracket includes a breakaway shear feature extending from the control bracket and into a portion of the energy absorbing strap.

7. The steering column assembly of claim 6, wherein the breakaway shear feature comprises a pin.

8. The steering column assembly of claim 6, wherein the breakaway shear feature extends into a recess defined by the energy absorbing strap.

9. The steering column assembly of claim 6, wherein the breakaway shear feature extends into a hole defined by the energy absorbing strap.

10. The steering column assembly of claim 6, wherein the breakaway shear feature extends from a portion of the body portion of the control bracket.

11. The steering column assembly of claim 6, wherein the energy absorbing strap is a single integrally formed component.

12. A steering column assembly comprising:
a lower jacket,
an upper jacket in telescoping engagement with the lower jacket, and
an energy absorbing strap assembly operatively coupled to the upper jacket, the energy absorbing strap assembly comprising:
an energy absorbing strap having a first leg portion, a second leg portion and a curved portion connecting the first leg portion and the second leg portion, the first leg portion coupled to the upper jacket, and
a control bracket defining a slot sized to receive the curved portion of the energy absorbing strap, wherein the control bracket comprises a backing portion and a body portion connected to each other with a connector segment, wherein the backing portion of the control bracket comprises a plurality of longitudinally extending rails laterally spaced from each other.

13. The steering column assembly of claim 12, wherein the plurality of longitudinally extending rails are parallel to each other.

* * * * *